Jan. 27, 1925.
O. RODRIGUEZ
VALVE
Filed Feb. 15, 1923
1,524,057
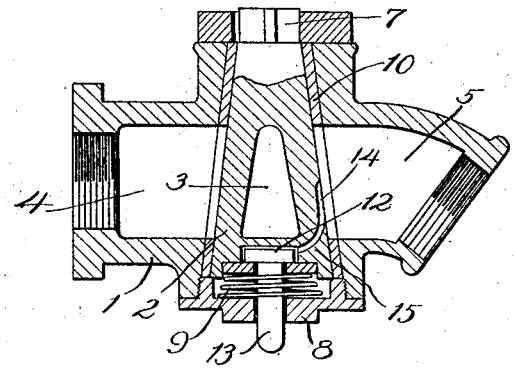
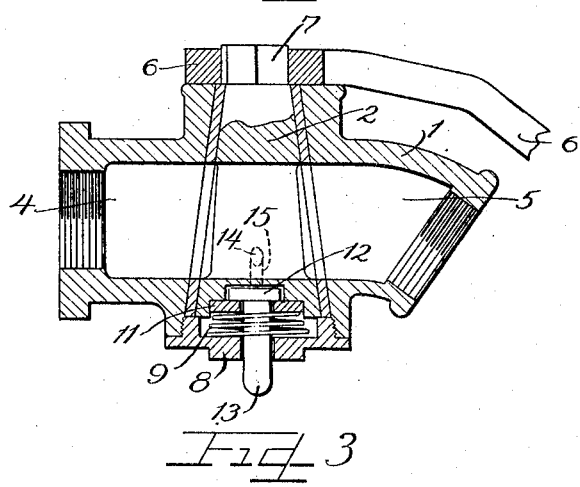
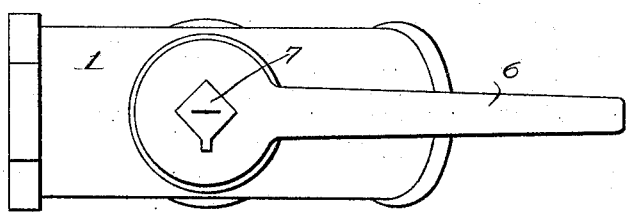
Witnesses
Robert E. Marks
O. Hartmann
Inventor
Oscar Rodriguez
by Charles...
Atty Patented Jan. 27, 1925.

1,524,057

UNITED STATES PATENT OFFICE.

OSCAR RODRIGUEZ, OF CHICAGO, ILLINOIS, ASSIGNOR OF ONE-HALF TO EMANUEL DEMEUR, OF CHICAGO, ILLINOIS.

VALVE.

Application filed February 15, 1923. Serial No. 619,163.

*To all whom it may concern:*

Be it known that I, OSCAR RODRIGUEZ, a citizen of the United States, and a resident of the city of Chicago, in the county of Cook and State of Illinois, have invented certain new and useful Improvements in Valves; and I do hereby declare that the following is a full, clear, and exact description of the same, reference being had to the accompanying drawings, and to the numerals of reference marked thereon, which form a part of this specification.

This invention relates to valves, more particularly valves for use on brake and steam lines of trains.

One of the principal objects of the invention is the provision of improved means for allowing the pressure on one side or other of the valve to fall gradually thereby aiding the disconnection of the air and steam line. After the valves at each end of the coupling have been disconnected there is still fluid under pressure in the coupling. According to the present invention, means are provided for allowing this pressure to be relieved before the coupling is broken. By the use of such means the life of the hose and rubber gaskets of the joining couplings is greatly increased.

Another object of the invention is the provision of a bleeding valve for valves which are normally closed but which may be opened by hand when desired.

Other and further important objects of the invention will be apparent from the disclosures in the accompanying drawings and the following specification.

The invention (in a preferred form) is illustrated in the drawings and hereinafter more fully described.

In the drawings:

Figure 1 is a vertical longitudinal section through a valve constructed in accordance with the present invention, the valve being in closed position.

Figure 2 is a view similar to Figure 1 showing the valve in open position.

Figure 3 is a top plan view of the valve in open position.

As shown on the drawings:

The valve shown is of the type used on train air brake systems and comprises a casing 1 and a rotatable valve member 2 having a transverse passage 3 through its central portion. The valve is opened and closed in the usual way by turning the member 2 so as to bring the passage 3 in and out of register with the passages 4 and 5 in the valve casing. The member 2 is turned by means of a handle 6 engaging a squared projection 7 on the member 2.

The passage 5 leads to the coupling in which it is desired to relieve the pressure and for that reason the valve member 2 is formed with a recess 14 leading to a passage 15 which is adapted to discharge fluid through the bottom of the member 2.

Below the member 2 is a plug 8 threaded into the lower part of the casing 1. This plug acts as a support for a spring 9 which presses the valve member 2 upwardly so as to insure fluid-tight contact with the lining 10 of the valve. The spring 9 does not press directly on the member 2 but on the washer 11 arranged in a recess in the bottom of the member 2. This washer acts as the seat of a valve disc 12 which is provided with a stem 13 which projects through both the washer 11 and plug 8.

The passage 15 leads to the upper side of the valve disc 12 so that normally the pressure in the passage 15 holds the valve 12 firmly on its seat. When, however, the valve is raised by pressure of the hand on the projecting end of the stem 13, the air can escape around the edge of the disc 12 and around the stem 13 into the atmosphere.

This auxiliary bleeding valve is shown in open position in Figure 1 and in closed position in Figure 2.

I am aware that may changes may be made and numerous details of contruction varied through a wide range without departing from the principles of this invention, and I therefore do not purpose limiting the patent granted hereon otherwise than as necessitated by the prior art.

I claim as my invention:

A valve, comprising a casing, a rotatable passaged valve mounted therein, a removable plug in the lower part of said casing, a washer disposed in a recess in the bottom of said valve member, a spring between said plug and washer for pressing said washer and valve member upwardly, a valve disk normally resting on said washer, and a stem in said valve disk passing loosely through said washer and plug, said valve member having a recess for permitting the fluid pressure on one side thereof to communicate with the top of said valve disk, said valve disk operated normally by said pressure to prevent the relief thereof but when unseated through said stem permitting pressure relief around said valve disk and through said washer and plug.

In testimony whereof I have hereunto subscribed my name in the presence of two subscribing witnesses.

OSCAR RODRIGUEZ.

Witnesses:
FRED E. PAESLER,
OSCAR HARTMANN.